MARY M. CRUTCHFIELD.
Pan for Poaching Eggs.

No. 133,205.  Patented Nov. 19, 1872.

Witnesses.  Inventor.

UNITED STATES PATENT OFFICE.

MARY M. CRUTCHFIELD, OF FAYETTE CORNER, TENNESSEE.

IMPROVEMENT IN PANS FOR POACHING EGGS.

Specification forming part of Letters Patent No. 133,205, dated November 19, 1872.

*To all whom it may concern:*

Be it known that I, MARY M. CRUTCHFIELD, of Fayette Corner, in the county of Fayette and State of Tennessee, have invented a new and valuable Improvement in Egg-Poachers; and I do hereby declare that the following is a full, clear, and exact description of the construction and operation of the same, reference being had to the annexed drawing making a part of this specification, and to the letters and figures of reference marked thereon.

Figure 1:
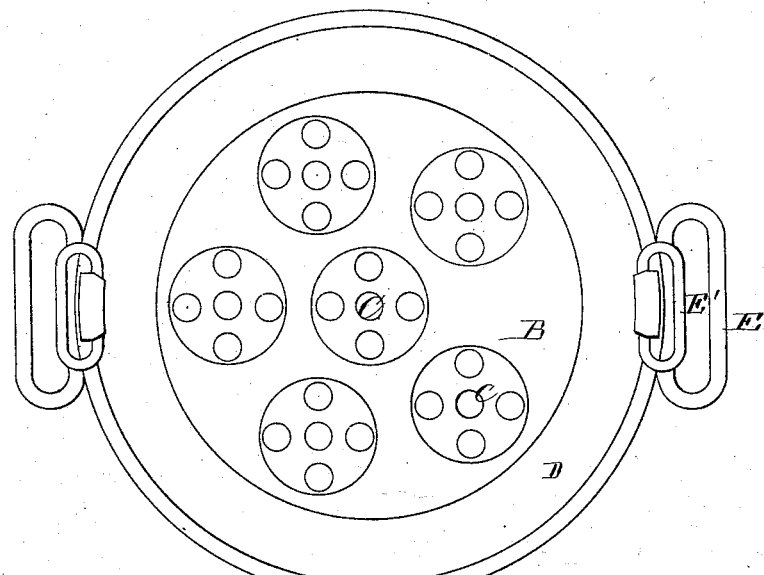
Figure 2:
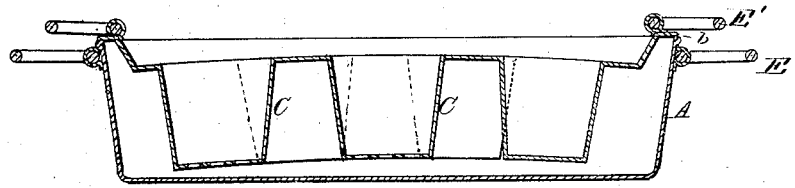

Figure 1 of the drawing is a representation of a plan view of my invention. Fig. 2 is a sectional view of the same.

This invention has relation to egg-poachers; and it consists in the novel construction of a utensil comprising a pan to contain water and a set of cups having perforated bottoms, and designed to contain each an egg, substantially as hereinafter more fully described.

Referring to the drawing, A designates a pan designed to contain the boiling water in which the eggs are to be poached. B designates a circular plate holding a number of open-mouthed cups, C, with perforated bottoms. In each of these cups is placed an egg, which is poached nicely by the boiling water which enters the cups through the perforations in the bottoms. D designates a raised rim with which the plate B is provided, and which is intended to prevent the albumen from running off at the sides of the plate. This rim is provided with a flange, $b$, which rests on the edge of the pan A and holds the bottoms of the cups above the bottom of the pan. E E' designate handles, attached, respectively, to the pan and cup-holder, as shown. The cups C may be secured to the plate B, or said plate may be perforated to receive removable cups.

What I claim as my invention, and desire to secure by Letters Patent, is—

The egg-poacher, having the pan A, plate B, and the perforated cups C, substantially as specified.

In testimony that I claim the above I have hereunto subscribed my name in the presence of two witnesses.

MARY MARGARET CRUTCHFIELD.

Witnesses:
T. A. DOYLE,
J. H. SMITH.